(12) United States Patent  (10) Patent No.: US 6,717,166 B2
Pease  (45) Date of Patent: Apr. 6, 2004

(54) NON-CONTACT MEASUREMENT DEVICE FOR ACCURATELY DETERMINING ANGULAR MEASUREMENTS IN RELATION TO PLUMB AND LEVEL

(75) Inventor: Alfred A. Pease, Ann Arbor, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 10/435,134

(22) Filed: May 9, 2003

(65) Prior Publication Data

US 2003/0201408 A1 Oct. 30, 2003

Related U.S. Application Data

(63) Continuation of application No. PCT/US01/49960, filed on Nov. 9, 2001, which is a continuation-in-part of application No. 09/803,535, filed on Mar. 9, 2001, now Pat. No. 6,593,587.
(60) Provisional application No. 60/247,270, filed on Nov. 10, 2000.

(51) Int. Cl.$^7$ .............................................. G01B 11/00
(52) U.S. Cl. .................................. 250/559.19; 356/625
(58) Field of Search .............................. 356/355, 357, 356/625, 614–615, 621–623, 603, 630, 634, 635, 636, 637, 485, 492, 496, 141.5; 382/154, 152, 106; 250/559.19, 559.22, 559.23, 559.24, 559.4, 559.2, 559.29, 559.38, 559.39

(56) References Cited

U.S. PATENT DOCUMENTS 4,938,589 A * 7/1990 Breithaupt ................ 356/3.05
6,049,385 A * 4/2000 Norita et al. ................ 356/613
6,373,579 B1 * 4/2002 Ober et al. ................. 356/627
6,593,587 B2 * 7/2003 Pease ..................... 250/559.19

* cited by examiner

Primary Examiner—Edward J. Glick
Assistant Examiner—Hoon Song
(74) Attorney, Agent, or Firm—Harness, Dickey & Pierce, P.L.C.

(57) ABSTRACT

A hand-held or tool integrated measurement device (10) is provided for quickly and accurately performing non-contact measurements of dimensions and/or angles associated with various objects in a home or commercial work area. The measurement device (10) generally includes at least one user input element (18), a non-contact sensor (22), an image processor (24), a gravity reference device (30), and a display element (26) packaged in a portable housing assembly (12). In operation, a user initiates the measurement by activating the user input element (18) associated with the measurement device (10). The non-contact sensor (22) receives a trigger signal from the user input element 18) and is operative to collect image data representative of at least a portion of the surface of a measured object. Likewise, the gravity reference device (30) receives the trigger signal from the user input element (18) and is operative to determine a local gravity vector. The image processor (24) in turn receives the image data, from the non-contact sensor (22) and the local gravity vector from the gravity reference device (30). The image data is then converted into angular measurement data for the surface of the measured object in relation to the local gravity vector. The display element (26) is operable to visually display the angular measurement data to the user.

12 Claims, 6 Drawing Sheets

NON-CONTACT MEASUREMENT DEVICE FOR ACCURATELY DETERMINING ANGULAR MEASUREMENTS IN RELATION TO PLUMB AND LEVEL

CROSS-REFERENCE TO RELATED APPLICATIONS

This application is a continuation of International Application Serial No. PCT/US01/49960, filed Nov. 9, 2001, which is a continuation-in-part of U.S. patent application Ser. No. 09/803,535 filed on Mar. 9, 2001 now U.S. Pat. No. 6,593,587 and claims priority under 35 U.S.C. §119(e) to U.S. Provisional Application No. 60/247,270 filed on Nov. 10, 2000 the specification and drawings of which are hereby expressly incorporated by reference.

BACKGROUND AND SUMMARY OF THE INVENTION

The present invention relates generally to a non-contact measurement device and, more particularly, a hand-held or tool integrated measurement device for quickly and accurately performing non-contact measurements of the angle of a surface in relation to plumb or level.

Measurement of dimensions and angles of wood products and woodworking equipment has up to now been performed through the use of various mechanical and electronic calipers, squares, protractors, steel rules, tape measurers, levels, and point range measuring devices. These various devices suffer from mechanical inaccuracies and human visual limitations (such as parallax). These devices also require sometimes difficult or impossible direct physical contact with the object being measured. In addition, it is often desirable to determine angular measurements, such as the angle of a flat surface, in relation to plumb and/or level.

Therefore, it is the purpose of the present invention to improve accuracy, remove most human judgement of measurement results, allow for measurements that are impossible to perform mechanically, and provide more convenient, faster measurements than conventional measurement devices. Furthermore, it is the purpose of the present invention to provide angular measurements in relation to plumb and/or level.

In accordance with the present invention, a hand-held or tool integrated measurement device is provided for quickly and accurately performing non-contact measurements of angles associated with various objects in a home or commercial work area. The measurement device generally includes a user input element, a non-contact sensor, a gravity reference device, an image processor, and a display element packaged in a portable housing assembly. In operation, a user initiates the measurement by activating the user input element associated with the measurement device. The non-contact sensor receives a trigger signal from the user input element and is operative to collect image data representative of at least a portion of the surface of a measured object. Likewise, the gravity reference device receives the trigger signal from the user input element and is operative to determine a local gravity vector. The image processor in turn receives the image data from the non-contact sensor and the local gravity vector from the gravity reference device. The image data is converted into angular measurement data for the surface of the measured object in relation to gravity. The display element is operable to visually display the angular measurement data to the user.

For a more complete understanding of the invention, its objects and advantages, reference may be had to the following specification and to the accompanying drawings.

DETAILED DESCRIPTION OF THE PREFERRED EMBODIMENTS

Figure 1:
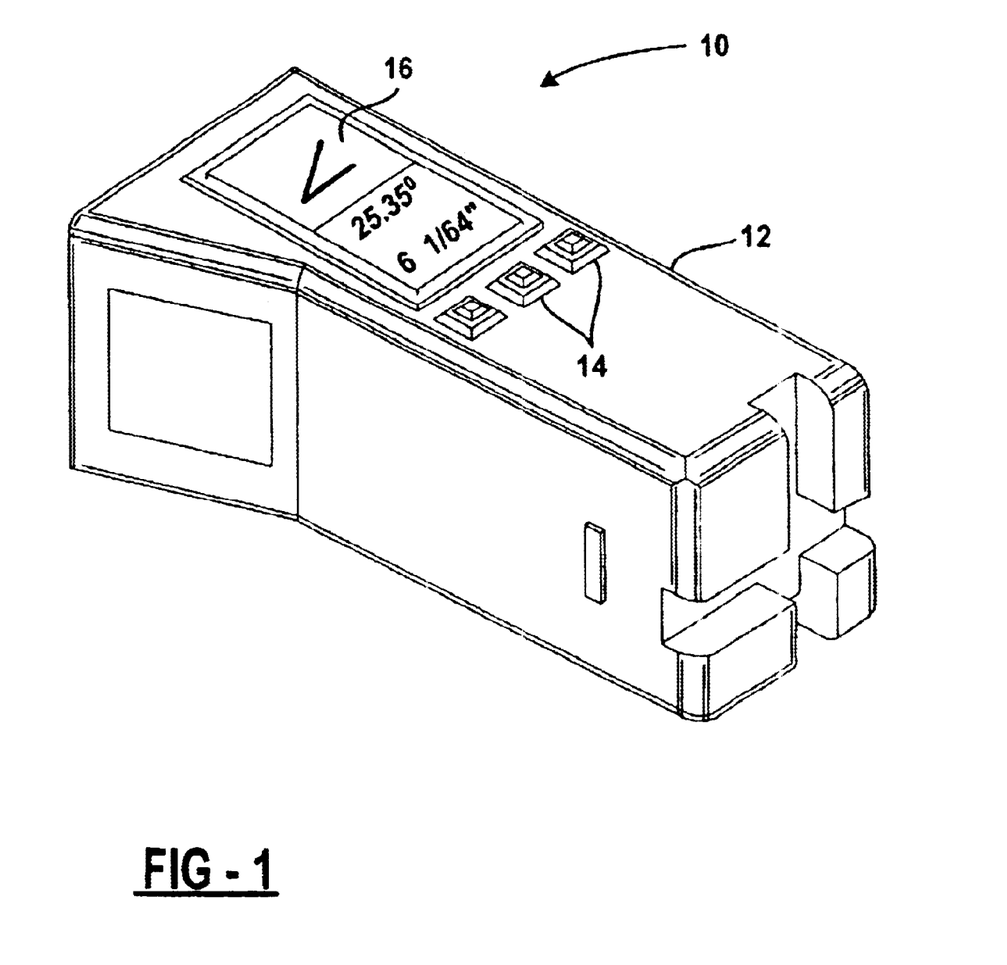
FIG. 1 is a perspective view of a portable non-contact measurement device in accordance with the present invention.

An exemplary portable measurement device 10 in accordance with the present invention is shown in FIG. 1. The portable measurement device 10 is housed in a housing assembly 12 which is sized to be hand-held by a user. It should be appreciated that housing assembly 12 may further include other design features (such as a handle or a hand-formed gripping area) that facilitate the portable nature of the measurement device 10. The operation of the measurement device may be controlled via the user interface elements integrated into the housing assembly 12. In this preferred embodiment, one or more push buttons 14 are used to receive input from the user and a display 16 is used to visually output measurement data to the user.

Figure 2:
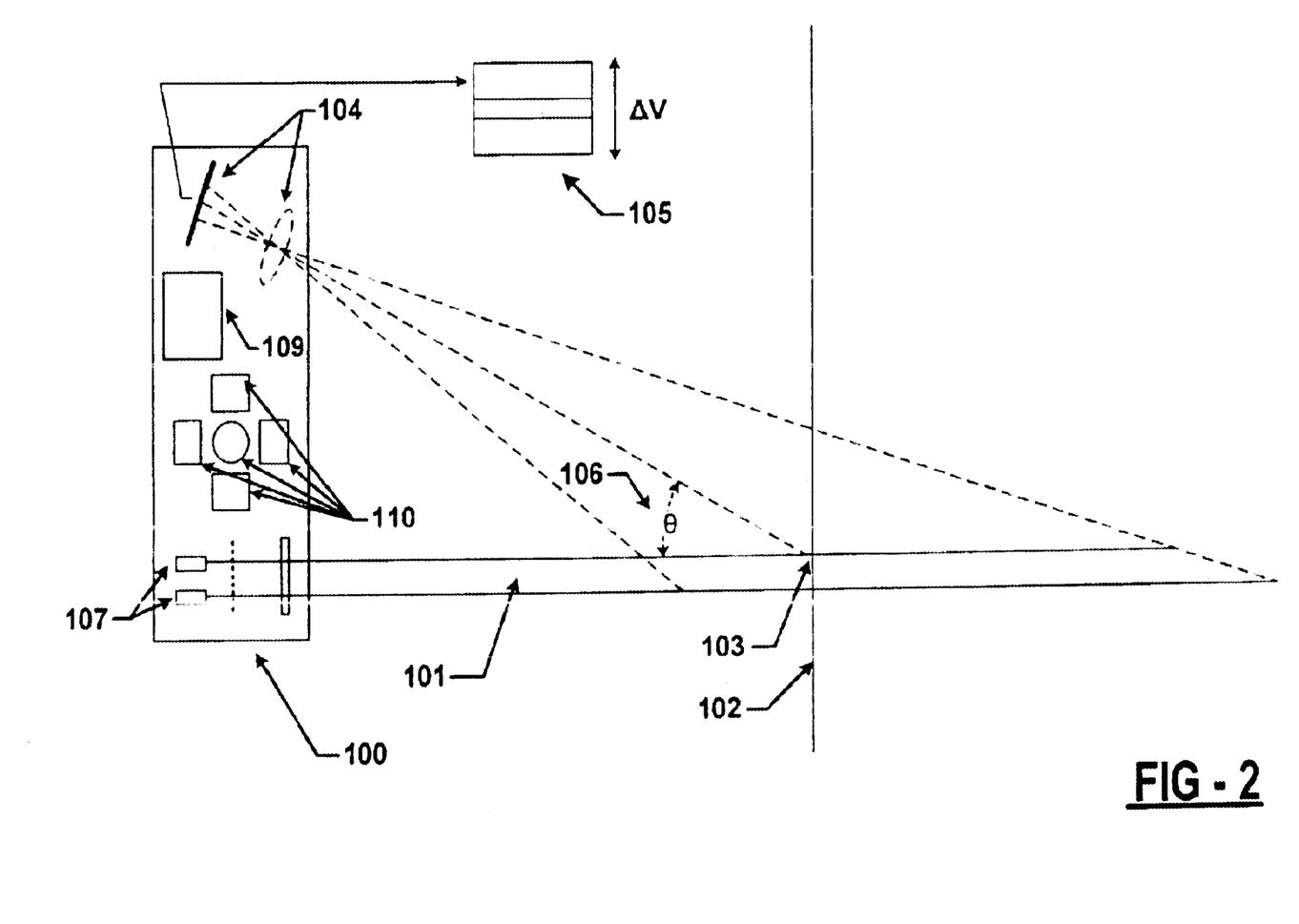
FIG. 2 is a diagram illustrating laser triangulation technology as employed in an exemplary non-contact sensor.

Referring to FIG. 2, the portable measurement device 100 is based on well known laser triangulation technology heretofore employed in various commercially available non-contact sensors. In general, a non-contact sensor 100 projects one or more planes of laser light 101 towards an object 102. The laser planes 101 are projected by light source assemblies 107 that preferably include a laser diode, a laser projection lens assembly and accompanying electronics for controlling the light source assembly. The points of intersection 103 of the projected laser plane and the object are then imaged by a electronic camera assembly 104. The electronic camera assembly 104 preferably comprises an imaging array (e.g, CCD or CMOS), a lens assembly, and accompanying electronics for controlling the electronic camera assembly.

The image data for a flat object oriented perpendicular to the laser plane is a nominally straight line as shown in inset 105. Due to the triangular relationship between the light source and the electronic camera assembly, displacement of the object 102 toward or away from the sensor 100 results in the movement of the image data up and down, respectively. The resolution of vertical displacement in the image (V) depends on the thickness of the laser line, the number of pixels in the electronic camera and the overall signal to noise ratio of the imaging system. As will be apparent to one skilled in the art, the triangulation angle (at the center of the field) is typically between 15 degrees and 25 degrees. For further details regarding an exemplary non-contact sensor, reference may be had to the TriCam sensors manufactured by Perceptron. Inc. of Plymouth, Mich.

Figure 3:
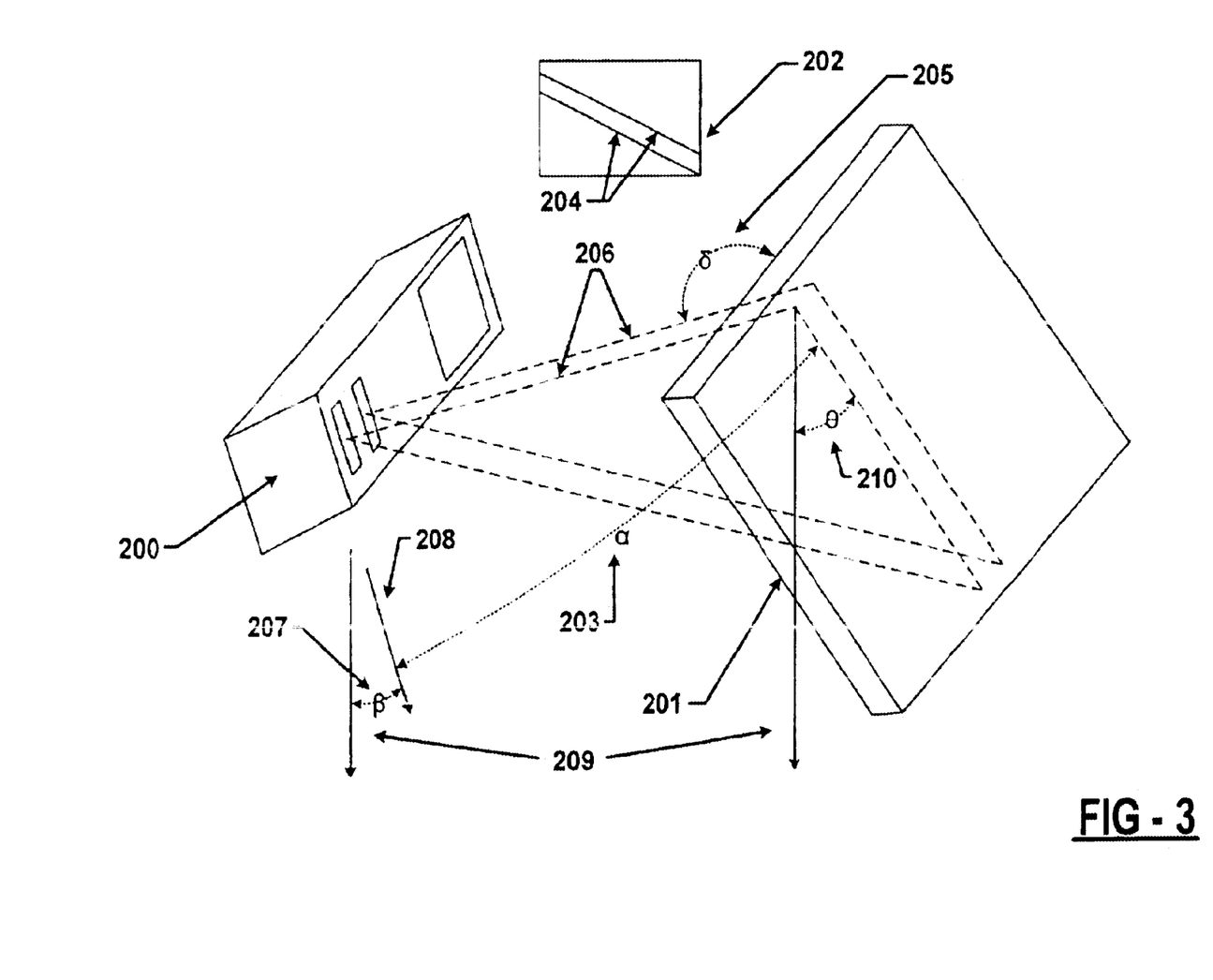
FIG. 3 is a diagram illustrating laser triangulation technology as employed by the non-contact measurement device of the present invention.

In accordance with the present invention, the portable measuring device further incorporates a gravity reference device. The portable measuring device 200 illuminates the surface 201 of an object with two projected laser planes as shown in FIG. 3. The measuring device 200 preferably uses at least two projected laser planes to improve the accuracy of measurement data. One skilled in the art will readily recognize that the second laser plane is used to eliminate error caused by a non-normal incident angle of the projected laser plane with the surface of the measured object. In this way, the measuring device 200 need not be perpendicular to the measure object in order to obtain accurate angular measurement data for the surface of the measurement object.

Inset 202 illustrates the image 204 as recorded by the sensor of the intersection of the two laser planes with the surface 201. The angle 203 between the measured surface 201 of the object and a vector normal to the sensor will map to an angle in the image 204. The relative distance between the two lines in the image 204 can be used to mathematically resolve the angle 205 between the planes of light 206 and the measured surface 201 of the object. An internal gravity reference produces a local gravity vector 209. Thus, the angle 207 between the sensor normal vector 208 and the local gravity vector 209 is also known. Lastly, data from these various angles may be used to calculate the angle 210 of the measured surface 201 in relation to the gravity vector 209.

Figure 4:
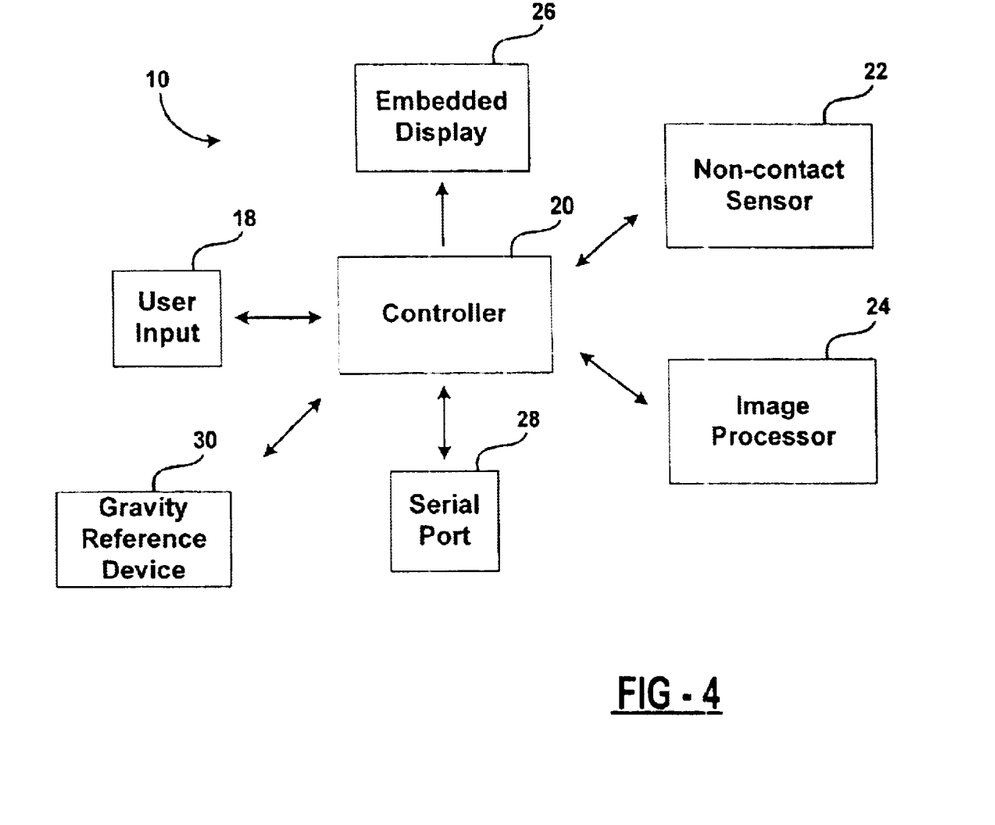
FIG. 4 is a block diagram depicting the primary components of the non-contact measurement device in accordance with the present invention.

FIG. 4 illustrates the basic components associated with the portable measurement device 10 of the present invention. The portable measurement device 10 generally includes one or more user input elements 18, a controller 20, a non-contact sensor 22, an image processor 24, a display 26, a gravity reference device 30, and a power supply (e.g., a battery). It should be appreciated that one or more subcomponents from an exemplary non-contact sensor (rather than a complete sensor unit) may be incorporated into the portable measurement device 10.

One or more user input elements 18 receive input commands from a user of the measurement device. Input commands may include power on/off commands, measurement trigger commands, measurement mode commands, measurement origin offset commands, etc. The input commands are in turn communicated to the controller 20. The user input elements 18 may assume a variety of forms, including push buttons, radial knobs, a touch screen display, or a combination thereof.

The controller 20 controls the overall operation of the measurement device 10. For instance, the controller 20 interfaces with the non-contact sensor 22 to facilitate acquisition of image data for a measured object. In particular, the controller 20 may issue power on/off commands and/or power setting commands to the light source associated with the non-contact sensor 22. The controller 20 may also issue power on/off commands, measurement trigger commands, exposure commands, resolution setting commands, and/or data transfer commands to the imaging array associated with non-contact sensor 22.

The controller 20 also interfaces with the gravity reference device 30 to facilitate acquisition of local gravity vector data. An exemplary gravity reference device suitable for use in this application is marketed under the brand name EZ-TILT 3000 and manufactured by Advanced Orientation Systems, Inc. of Linden, N.J.

Furthermore, the controller 20 interfaces with the image processor 24. The image processor 24 is adapted to retrieve image data from the non-contact sensor 22 and to retrieve gravity vector data from the gravity reference device 30. The image processor 24 is operable to convert the image data into measurement data for the measured object. The image processor 24 includes one or more software algorithms for converting the raw image data into measurement data as is well known in the art. It is envisioned that a different algorithm may be used depending on the type of measurement being taken (e.g., width of an object, angle between two adjacent surface, etc.) by the device.

Of particular interest, the image processor 24 is further operable to convert the image data into angular measurement data for a surface of the measured object, and then determine the angular measurement of the surface in relation to the gravity vector. The image processor 24 employs various software algorithms for determining the angular measurement in relation to the gravity vector. It is to be understood that the angular measurement of the surface can be provided to the user in relation to plumb (vertical) or level (horizontal).

A display 26 embedded into the housing of the measurement device is used to visually display the measurement data to the user. To do so, the display is adapted to receive the measurement data from the image processor 24. In addition, the display 26 may further receive input commands from the controller as to how the dimensional data is to be displayed to the user. The display 26 may be graphic or numeric and assume a variety of forms, such as an LED or a LCD.

The portable measurement device 10 may optionally include an external communication port 28 (e.g., RS-322, USB, wireless port, etc). It is envisioned that the controller 20 may transmit measurement data via the communication port 28 to an external source. In addition, the controller 20 may also receive remote activation commands or updates to the software algorithms via the communication port 28 from an external source.

Figure 5A:
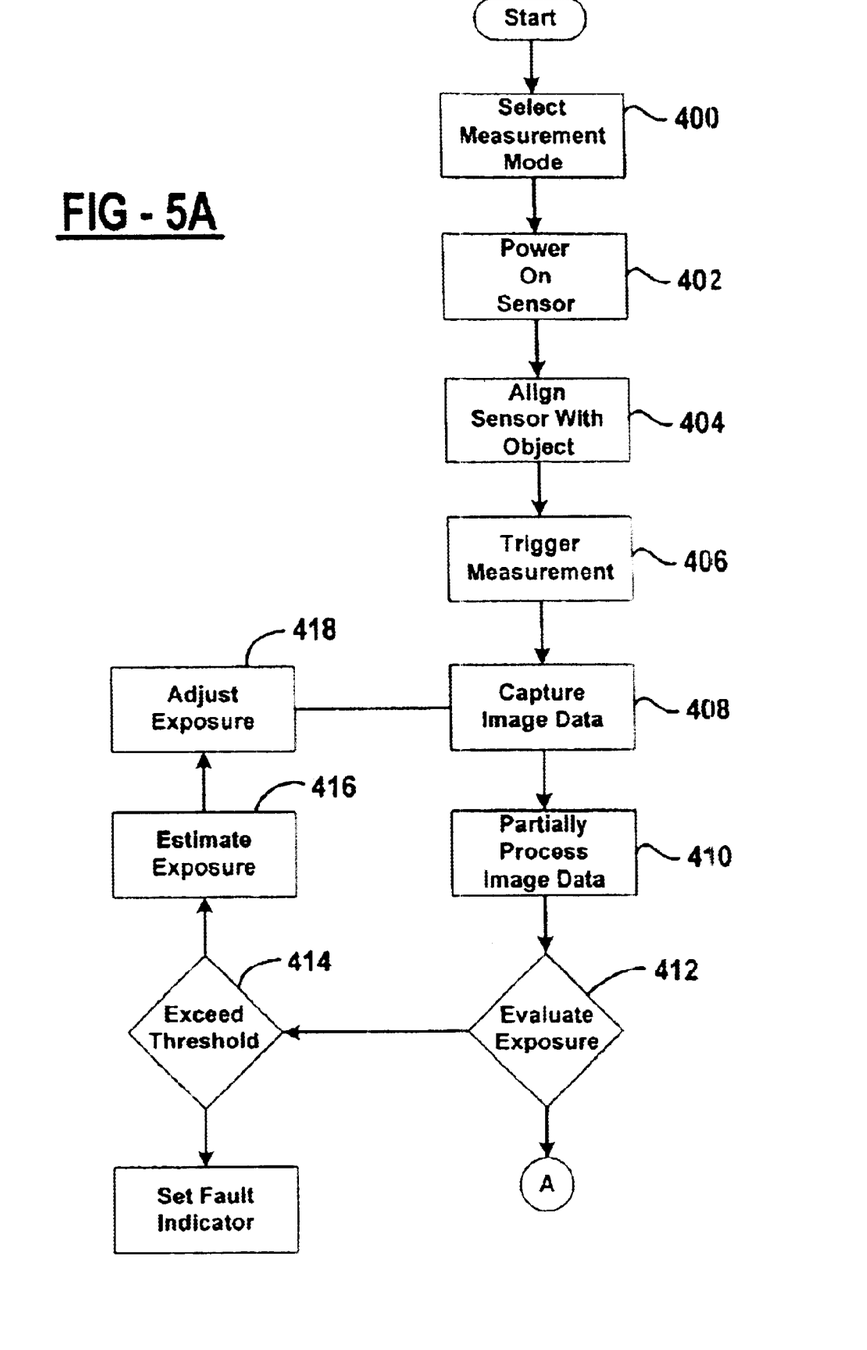
FIGS. 5A and 5B are flow charts depicting an exemplary measurement cycle for the non-contact measurement device in accordance with the present invention.

A typical measurement cycle for the above-described measurement device 10 is depicted in FIG. 5. Initially, device preparation steps are performed by the user. In step 400, the user selects the measurement mode for the device. The measurement mode indicates the type of measurement that is to be taken (e.g., width of an object, angle between two adjacent surfaces, angle of a surface in relation to the gravity vector, etc.) by the device. As will be apparent to one skilled in the art, the measurement mode determines the algorithm used to convert the image data into measurement data as well as dictates the how the measurement data will be displayed to the user. In addition, the sensor is powered on by the user in step 402. As a result, the measure laser plane and possibly an auxiliary alignment beam are projected from the measurement device 10.

Next, the user directs the measurement device towards the object to be measured in step 404. In particular, the measurement device is positioned such that the measured object falls within the field of view of the non-contact sensor. It is envisioned that an auxiliary laser light source may be used to assist the user in localizing the measured object within the center of the field of view of the sensor.

The user can then trigger a measurement as shown in step 406. By activating the applicable user input element, a trigger command is generated and sent to the controller. In response to the trigger command, the controller sets the camera exposure to some predefined value and then commands the camera to capture image data at step 408. It is also envisioned that the user may set the camera exposure via the user input elements as part of the above-described device preparation process.

In a preferred embodiment of the present invention, the image data may be partially processed to determine correctness of the exposure setting as shown in step 410. One skilled the art will readily recognize that the exposure setting is dependent on various factors such as the angle of incidence and the material of the measured object. The adequacy of the exposure is evaluated in step 412. If the exposure setting for the camera is not correct, the controller may estimate the correct setting at step 416 and adjust the exposure setting at step 418 before commanding the camera to take another image. This process may be repeated until an accurate exposure setting cycle is obtained. It is envisioned that no more than two cycles would be needed in a typical application in order to achieve an accurate exposure setting. Moreover, it is expected that the time for this iterative process is much less than one second. In the event that no exposure setting is deemed to be adequate after some predefined number of iterations or some predefined threshold time, then a fault indicator is provided to the user at step 414.

Figure 5B:
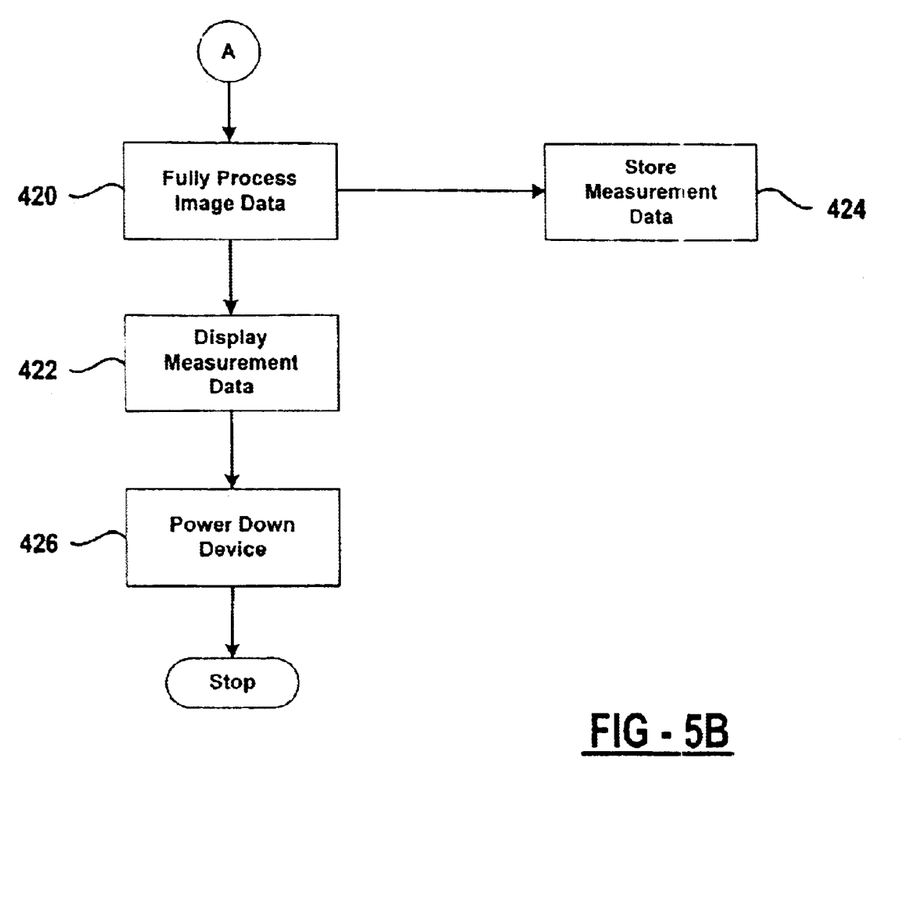

If the exposure setting is deemed to be acceptable, then the image data is fully processed in step 420. To do so, the image data is transferred from the sensor to the image processor. The image processor in turn converts the image data to measurement data using the applicable algorithm, and applies the gravity sensor data. In step 422, the measurement data is visually displayed to the user. In addition to the measurement data, a visual indicator of the measurement mode as well as a visual representation of the measured object may also be displayed to the user. In step 424, the measurement data may be stored for subsequent processing in a memory space residing on the device, or for possible transfer to a computer. The above-described measurement cycle (or some portion thereof) may be repeated to obtain additional measurement data.

Lastly, the measurement device may be powered down upon completion of the measurement cycle at step 426. After some predefined time period of inactivity, it is envisioned that the sensor will power down to a standby mode. In the standby mode, the display is still readable until the measurement device is completely turned off. It is to be understood that only the relevant steps of the measurement cycle are discussed above, but that other software-implemented instructions may be needed to control and manage the overall operation of the portable measurement device.

It should also be appreciated that the portable nature of the measurement device 10 allows it to be placed on any flat surface (e.g., on a workbench or on the floor), mounted in a stand, or positioned in other areas of a typical work environment, such that the housing assembly of the device serves as a reference plane for the measurement data.

Typical applications for the hand-held measurement device of the present invention include, but are not limited to: measurement of the angle of a nearby object, such as a wooden post, beam, or construction wall as it is raised into place to determine the point at which the object is perpendicular to the earth's surface; determination of when a nearby flat surface, such as a tabletop, is directly level with the earth's surface; or determination of the angle of any nearby object, whether stationary or moving, in relation to gravity. Thus, the measurement device may be used in any application where a mechanical bubble level or electromechanical level is used. In addition, the measurement device may be used in applications where said levels cannot be used because of space limitations, or because the object being leveled is too hot or too delicate to touch. Other types of specific applications include, but are not limited to: leveling refrigeration units; hanging cabinets; installing indoor and outdoor doors; installing windows; leveling floors; determining grade and slope; and determining roof pitch.

From the foregoing, it will be appreciated that the present invention provides a significant advance in the art of portable measurement devices. The invention quickly and accurately performs non-contact measurements of dimensions and/or angles associated with various objects in a home or commercial work area. Of particular importance, the present invention determines angular measurement data for the surface of an object in relation to plumb or level. While the invention has been described in its presently preferred form, it will be understood that the invention is capable of modification without departing from the spirit of the invention as set forth in the appended claims.

What is claimed is:

1. A hand-held measurement device for determining angular measurement data for a surface of a measured object, comprising:

a portable housing assembly;

a user input element integrated with the housing assembly for generating a trigger signal to initiate measurement of the measured object;

a non-contact sensor mounted in the housing assembly and adapted to receive the trigger signal from an input device, the non-contact sensor is operable to collect image data representative of the surface of the measured object;

a gravity reference device mounted in the housing assembly and operable to determine a local gravity vector;

an image processor mounted in the housing assembly and adapted to retrieve image data from the non-contact sensor and the local gravity vector from the gravity reference device, the image processor is operable to convert the image data into angular measurement data for the surface of the measured object in relation to the gravity vector; and a display integrated with the housing assembly and adapted to receive angular measurement data from the image processor, the display is operable to visually display the angular measurement data.

2. The hand-held measurement device of claim 1 wherein the non-contact sensor emits at least two planes of structured light onto the measured object.

3. The hand-held measurement device of claim 1 wherein the non-contact sensor emits structured light in a predefined planar configuration onto the measured object and receives image data correlating to an intersection between the structured light and the surface of the measured object.

4. The hand-held measurement device of claim 1 wherein the user input element and the display are cooperatively operable to facilitate selection of a measurement mode by a user, where the measurement mode is indicative of a type of measurement to be taken by the measurement device.

5. The hand-held measurement device of claim 4 wherein the measurement mode is to be selected from the group consisting of the angle between any two surfaces, compound angles for any two surfaces, the height of an object, the width of an object, the diameter of an object, the angle of a measured surface in relation to plumb and the angle of a measured surface in relation to level.

6. The hand-held measurement device of claim 4 wherein the display is further operable to display at least one of a visual indicator of the measurement mode and a visual representation of the measured object.

7. A method for determining dimensional measurement data for a measured object, comprising the steps of:

providing a hand-held measurement device;

triggering a measurement of the measured object by activating a user input element associated with the measurement device;

collecting image data via a non-contact sensor, the image data representative of a surface of the measured object;

collecting gravity vector data;

converting the image data into angular measurement data for the surface of the measured object in relation to the gravity vector data using an image processor associated with the measurement device; and visually displaying the angular measurement data on a display device associated with the measurement device.

8. The method of claim 7 further comprising the step of directing the measurement device towards the measured object, such that the non-contact sensor having a field of view and the measured object falls within the field of view of the non-contact sensor, prior to the step of triggering a measurement.

9. The method of claim 7 further comprising the step of selecting a measurement mode for the measurement device, where the measurement mode is indicative of a type of measurement to be taken by the measurement device, prior to the step of triggering a measurement.

10. The method of claim 9 wherein the measurement mode is selected from the group consisting of the angle between any two surfaces, compound angles for any two surfaces, the height of an object, the width of an object, the diameter of an object, the angle of a measured surface in relation to plumb and the angle of a measured surface in relation to level.

11. The method of claim 7 wherein the step of collecting image data further comprises the step of emitting at least two planes of structured light onto the measured object and receiving image data indicative of the intersection of the two planes of structured light and the surface of the measured object.

12. The method of claim 7 wherein the step of visually displaying dimensional measurement data further comprises displaying at least one of a visual indicator of the measurement mode and a visual representation of the measured object.

* * * * *